United States Patent [19]
Renko

[11] Patent Number: 5,348,379
[45] Date of Patent: Sep. 20, 1994

[54] EXPANDING AND CONTRACTING BICYCLE RIM

[76] Inventor: John E. Renko, 605 Alabama Ave., Bremen, Ga. 30110

[21] Appl. No.: 101,015

[22] Filed: Aug. 3, 1993

[51] Int. Cl.⁵ .............................................. B60B 21/00
[52] U.S. Cl. ...................................... 301/32; 301/34; 301/95
[58] Field of Search ................... 301/30, 31, 32, 33, 301/34, 95, 100

[56] References Cited

U.S. PATENT DOCUMENTS

| | | | |
|---|---|---|---|
| 1,337,652 | 4/1920 | Hoecker | 301/34 X |
| 1,455,684 | 5/1923 | Varner | 301/34 |
| 1,535,398 | 4/1925 | Carver | 301/34 |
| 1,611,046 | 12/1926 | Klingaman | 301/33 |
| 1,667,243 | 4/1928 | Cameron | 301/34 X |
| 1,855,000 | 4/1932 | Robinson | 301/32 |
| 1,863,235 | 6/1932 | Benson | 301/33 |
| 1,903,566 | 4/1933 | Wagonhorst | 301/33 |

*Primary Examiner*—Russell D. Stormer
*Attorney, Agent, or Firm*—James B. Middleton

[57] ABSTRACT

An improved wheel for a bicycle or similar vehicle has a segment in the rim of the wheel which is selectively removable from the usual circular path of the rim, creating a gap in the rim. The rim is then contracted to form a smaller circle. With the smaller diameter, a tire, with or without a tube, can be placed on, or removed from, the rim without the necessity to stretch or otherwise deform the tire or tube. The spokes are held with respect to the rim during contraction of the rim, so the spokes bow during contraction. A band extends around the rim to hold the spoke ends, and one end of the band spans the gap to maintain alignment of the rim so the rim is always circular.

8 Claims, 4 Drawing Sheets

U.S. Patent         Sep. 20, 1994         Sheet 1 of 4         5,348,379
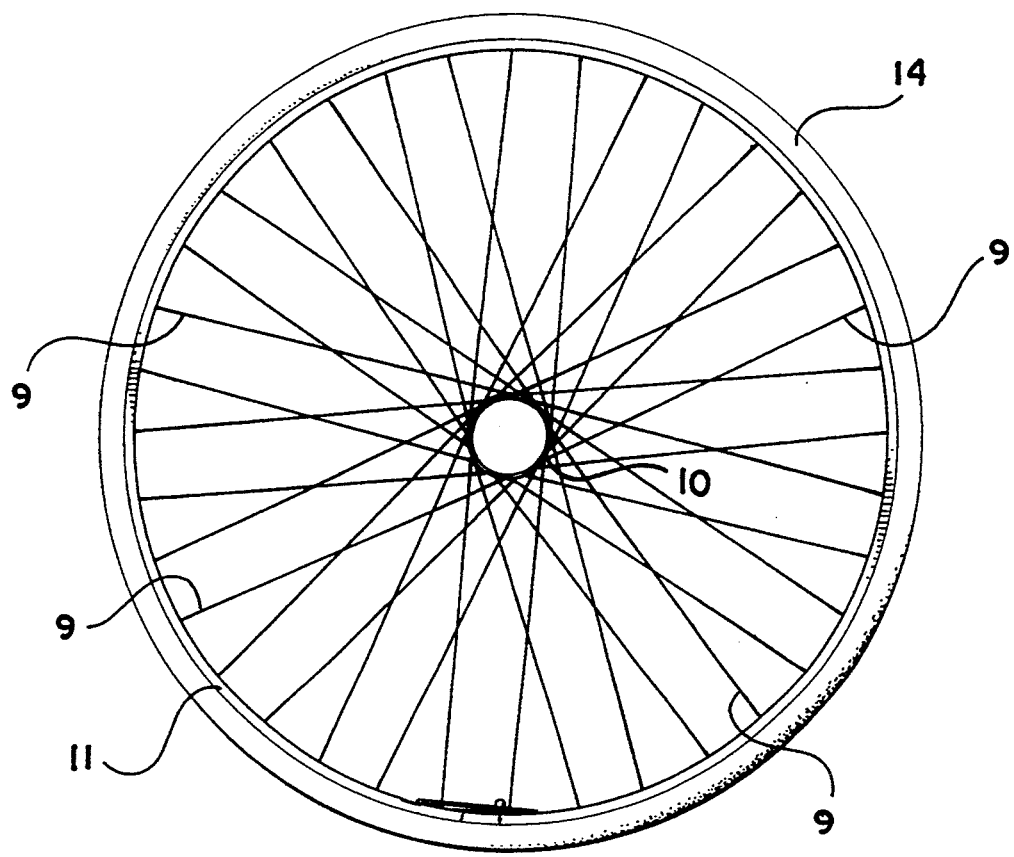
Fig_1A
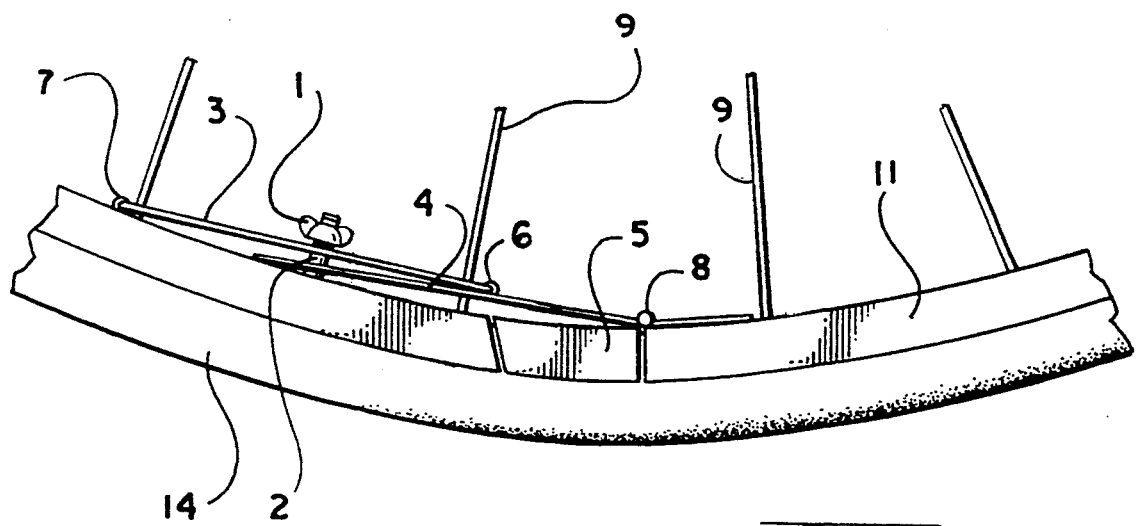
Fig_1B

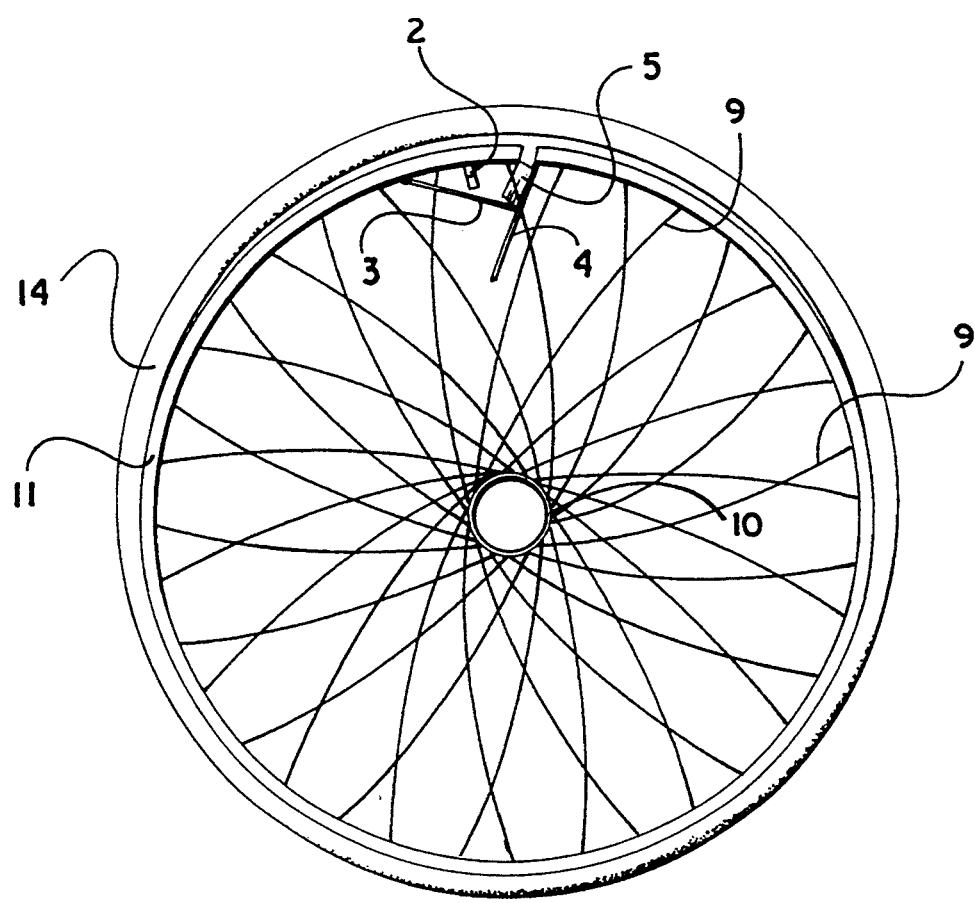
Fig_2A
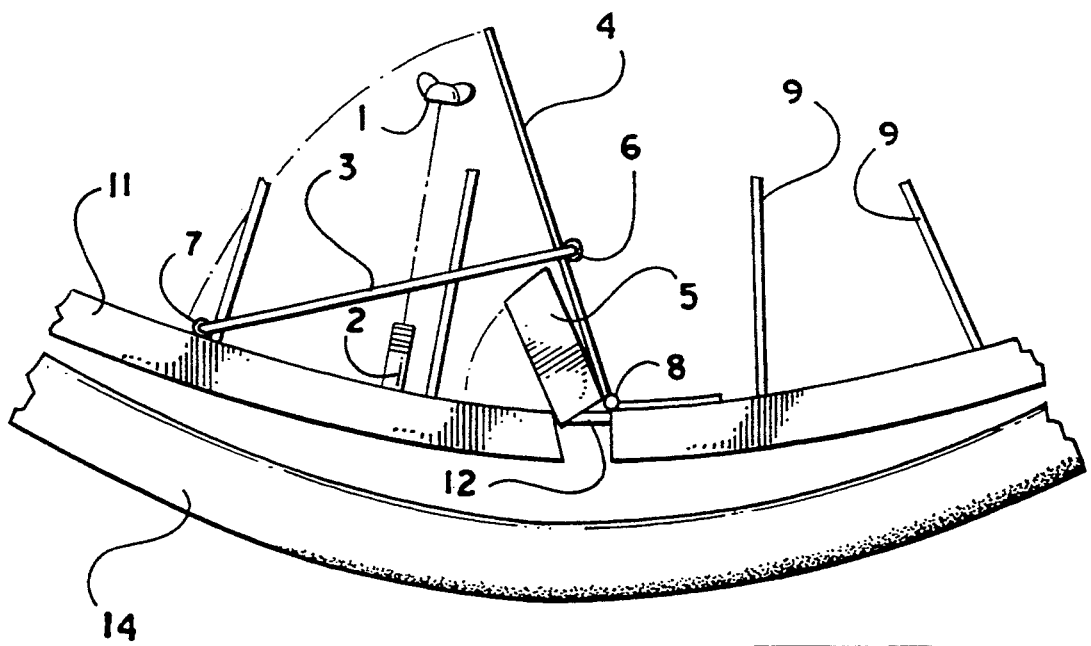
Fig_2B

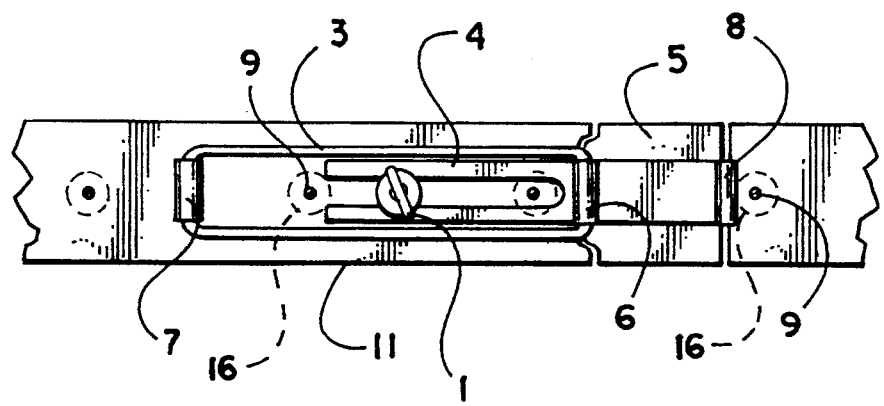
Fig_4A
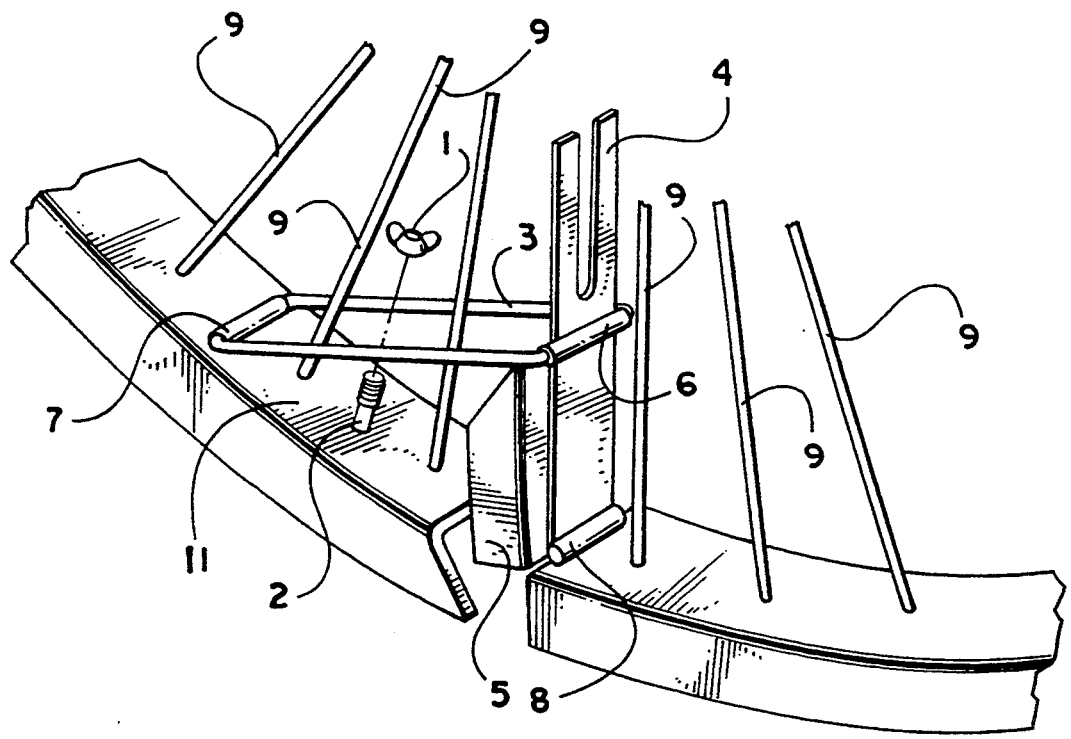
Fig_4B 5,348,379

EXPANDING AND CONTRACTING BICYCLE RIM

BACKGROUND OF THE INVENTION

1. Field of the Invention

This invention relates generally to bicycle wheels, and is more particularly concerned with a contractible rim for receiving a non-stretchable tire.

2. Discussion of the Prior Art

The commonly used rim and tire for bicycles includes a generally rigid rim held by a plurality of spokes extending from a central hub. Since the rim is rigid, one must stretch the tire, and tube when used, to place the tire on, or remove the tire from, the rim. The tire is necessarily quite tough and difficult to stretch, so prying-type tools are required to mount and demount a tire.

There have been many efforts to improve the bicycle rim by breaking the rim in its periphery, and allowing sections of the rim to hinge inwardly, or for the rim to assume a helical shape with a smaller outer circumference than the wheel when in use. The helical shape is disclosed in U.S. Pat. Nos. 1,337,652, 1,455,684, 1,535,398, 1,611,046, and 1,667,243 for example. The hinged sections are shown in U.S. Pat. Nos. 1,811,109, 1,855,000, 1,887,984, 1,931,229, and 2,469,629, for example.

The prior art rims tend not to have spokes at the time the rims are contracted; and, the rims are rather severely distorted on contraction. Additionally, if there is a tube on the rim at the time of contraction, the end of the rim is likely to damage the tube as the rim moves inwardly, out of the circular path of the normal rim.

SUMMARY OF THE INVENTION

The present invention provides a contractible bicycle rim wherein a segment of the periphery of the rim is selectively removable to allow contraction of the rim. The rim further includes a tongue means for bridging the gap left by the removed segment so that the ends of the rim remain aligned and the shape of the rim remains circular, though of smaller circumference. The spokes of the bicycle wheel remain in place, and are simply bowed somewhat when the rim is contracted to its smaller circumference. The bases of the spokes are preferably held in place so the spokes are forced to bow rather than exert pressure on the tire and/or tube.

The present invention further includes a tool for selectively removing and inserting the removable segment, and for controlling the movement of the ends of the rim during removal and insertion of the segment. The tool may be permanently fixed to the rim, or may be separable for use only as needed.

BRIEF DESCRIPTION OF THE DRAWINGS

These and other features and advantages of the present invention will become apparent from consideration of the following specification when taken in conjunction with the accompanying drawings in which:

FIG. 1a is a side elevational view showing a rim made in accordance with the present invention, the rim being in its normal condition with a tire mounted thereon;

FIG. 1b is an enlarged fragmentary view showing the selectively removable segment, and a tool for removal and insertion of the removable segment;

FIG. 2a is a view similar to FIG. 1a, but showing the segment removed and the rim contracted;

FIG. 2b is a view similar to FIG. 1b, but showing the segment removed and the rim contracted;

FIG. 3b is a perspective view of the portion of the rim shown in FIG. 3a;

FIG. 4a is a top plan view showing the portion of the rim illustrated in FIG. 3a; and, FIG. 4b is a perspective view showing the portion of the rim as illustrated in FIG. 2b.

DETAILED DESCRIPTION OF THE EMBODIMENT

Figure 3A:
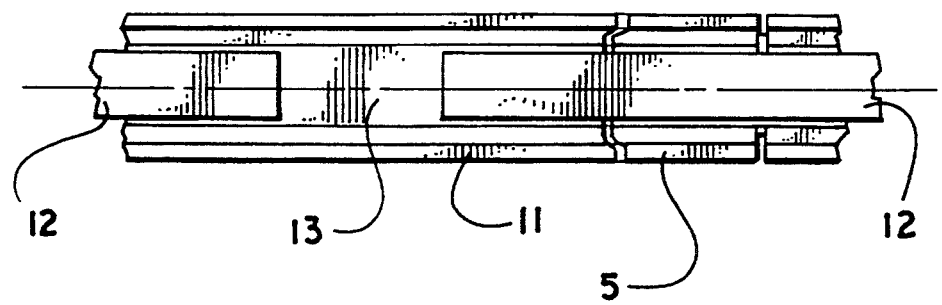
FIG. 3a is a bottom plan view of a portion of the rim showing the removable segment and the tongue means.

Referring now more particularly to the drawings, and to that embodiment of the invention here presented by way of illustration, FIG. 1a shows a bicycle wheel including a rim 11 having a hub 10 centrally thereof and concentric therewith. As is conventional in bicycle wheels, there is a plurality of spokes that extend from the hub 10 to the rim 11. A tire 14 is received within the rim 11, and the tire 14 may or may not have a tube therein.

The improvement of the present invention includes the provision of a removable segment 5 in the rim 11. As will be discussed in more detail below, the segment 5 can be removed from the rim to define a gap in the rim. The rim can then be contracted to close the gap and the rim will assume a smaller circumference. The rim can subsequently be expanded to its original size, and the segment 5 reinserted into the rim.

For an understanding of the details of the removable segment 5, attention is directed to FIG. 1b of the drawings. A portion of the rim 11 is shown with the tire 14 in place. The segment 5 is shown, and it can be seen that the segment 5 is hinged at 8 to the rim 11. It will be noticed that the end of the segment 5 opposite from the hinge 8 is angled so the segment 5 can pivot about the hinge 8 to be removed from the normal circular path of the rim 11.

Those skilled in the art will understand that many different mechanical arrangements may be used to selectively remove and replace the segment 5 in the rim 11, but the arrangement here illustrated is one simple and practicable system. There is a lever 4 that is fixed to the segment 5 to pivot about the hinge 8. The lever 4 is preferably longer than the segment 5, so the lever 4 engages the rim some distance from the end of the segment 5. For controlling the rim in response to motion of the lever there is a clip 3 pivoted to the lever 4 at 6, and pivoted to the rim at 7.

Attention is next directed to FIG. 2a which shows the wheel of FIG. 1a, but with the rim 11 contracted to a smaller circumference. It will be noticed that the segment 5 has been pivoted to be removed from the circumferential path of the rim, and the rim 11 has been urged into a smaller circumference so the tire 14 is no longer completely held on the rim 11. It will therefore be understood that the tire 14 can be easily removed from the rim 11, and a different tire 14 can be installed if desired.

It should be noticed in FIG. 2a that the spokes 9 are bowed. As will be discussed below, the spokes are held in place with respect to the rim 11; therefore, when the rim 11 assumes a smaller circumference, the spokes will be bowed.

Looking at FIG. 2b, the mechanism for moving the segment 5 can be seen more clearly. The segment 5 is hinged to the rim 11 at 8, and the segment 5 is here shown as pivoted upwardly to leave a gap in the rim 11. The lever 4 is pivoted along with the segment 5, and motion of the lever 4 pulls the clip 3, causing the rim 11 on each side of the gap to move together. As the gap closes, of course the rim 11 becomes smaller. It can also be seen in FIG. 2b that there is a stem 2 fixed to the rim 11 and adapted to receive a wing nut 1. As will be better understood hereinafter, the wing nut 1 holds the lever 4 in place when the segment 5 is in place in the rim 5.

Figure 3B:
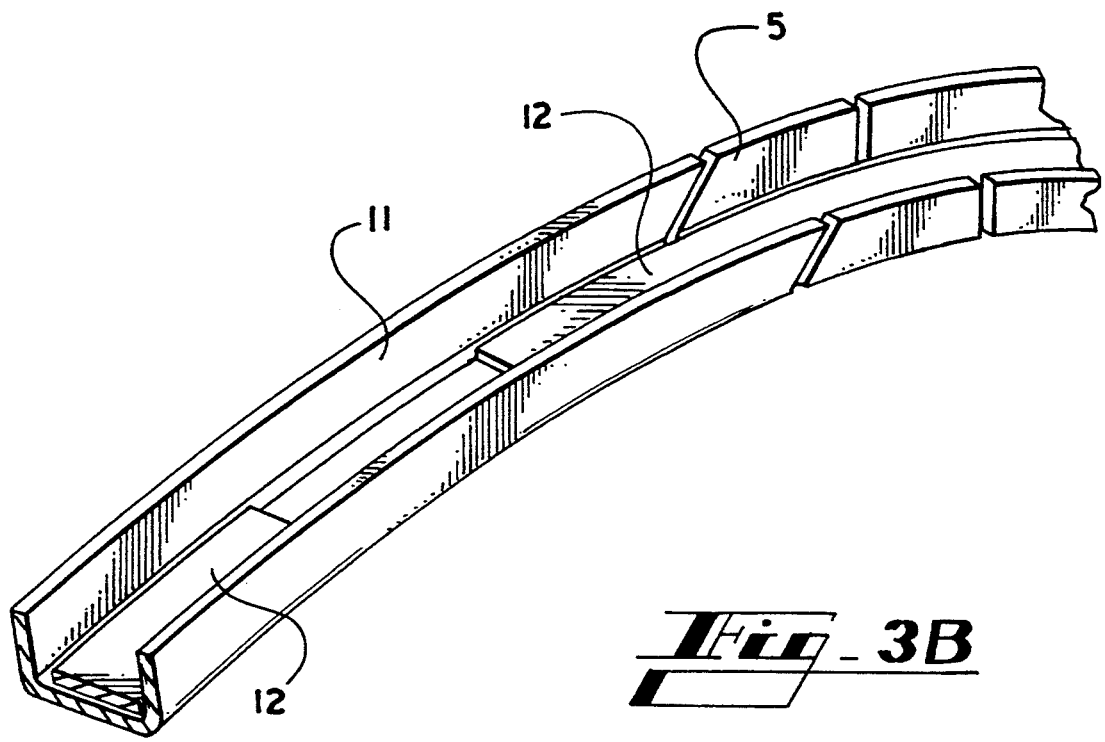

FIGS. 3a and 3b show the inside of the rim in the vicinity of the segment 5. It will here be seen that there is a tongue 12 within the rim 11 and extending across the area of the segment 5. The tongue 12 is in fact one end of a band 12 that extends most of the way around the circumference of the rim 11. As is best shown in FIG. 3b, one end of the band 12 is just beyond one end of the segment 5, and the opposite end is spaced only a small distance from the first end. It will therefore be understood that the band 12 extends almost the full circumference of the rim 11.

The band 12 will be fixed to the rim 11 in the area adjacent to the hinge 8 for the segment 5, but the rest of the tongue 12 will be unsecured. As a result, when the rim 11 is being contracted, the rim 11 can slide with respect to the tongue 12. The tongue 12, then, maintains alignment of the rim 11 on opposite sides of the gap created by removal of the segment 5.

With the above in mind, it will be understood that only a small portion of the band may be used to define the tongue 12. The rest of the band 12 performs a different function, which is to hold the ends of the spokes 9 in place while the rim 11 is contracting. Those skilled in the art will realize that the spoke ends 16 are loose in holes in the rim 11. Various locking means may be utilized, but the band 12 is simple and effective. The band 12 may rest within a groove 13.

Attention is next directed to FIGS. 4a and 4b of the drawings for a better understanding of the construction of the tool for expanding and contracting the rim 11. FIG. 4a shows the lever 4 in plan view where it can be seen that the lever 4 is bifurcated to allow the lever 4 to avoid spokes 9 during operation of the lever 4. Also, the bifurcated construction allows receipt of the stem 2, and the lever 4 can be held down (against the rim 11) by the wing nut 1 threaded onto the stem 2.

It can also be seen in FIG. 4a that the clip 3 is in the form of an open loop. One end of the clip 3 is pivoted to the rim 11 at 7, and the opposite end of the clip is pivoted to the lever 4, at 6. The construction is well shown in FIG. 4b, which shows the lever 4 in its up position, with the segment 5 removed from the circular path of the rim 11.

With the above description in mind, the operation of the device will be understood. The rim 11 of the bicycle wheel includes a removable segment such as the segment 5. While the segment 5 is here shown as pivotal, those skilled in the art will understand that the segment may be completely removable and the same results could be obtained. With the segment 5 removed from the normal circular path of the rim 11, the rim 11 can contract into a smaller circle. The spokes 9 will of course remain the same length, and the ends 16 of the spokes are held against the rim 11 during contraction of the rim 11 by the band 12. As a result, the spokes 9 will bow during contraction of the rim 11.

The tool for controlling contraction and expansion of the rim 11 comprises the lever 4 and clip 3, and this tool is permanently fixed to the rim. Again, it will be understood by those skilled in the art that the tool may be separated, and used on the wheel when needed. Such an arrangement would prevent some of the balancing problem introduced by adding the tool to the wheel of the present invention.

As the rim 11 is contracted, it will be remembered that the tongue 12 at all times bridges the gap produced by removal of the segment 5, so the ends of the rim 11 at the gap remain aligned. Thus, during contraction of the rim 11, the rim remains at all times circular.

When the rim 11 is fully contracted, a tire, with or without a tube, can be placed over the rim, or removed from the rim, without the necessity for stretching the tire or tube. This feature allows the tire and tube to be completely redesigned. One can now utilize a tube or the like that has sufficient integrity to support the weight of the bicycle without air under pressure. Again, there may be a tire with a tube for providing support received within the tire, or the tire itself may have the integrity to support the required weight.

When the rim 11 of the present invention is fully expanded, there will be enough force against a tire and tube to secure the tire without slippage.

It will be understood by those skilled in the art that the embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. In a wheel comprising a rim extending through a first circular path, a hub centrally of said rim, a plurality of flexible spokes connecting said rim to said hub, and a tire mountable on said rim, the improvement comprising a segment of said rim selectively removable from said first circular path for defining a gap in said rim, means for urging said rim without said segment into a second circular path that is smaller than said first circular path, and a tongue extending across said gap for maintaining alignment of said rim adjacent to said gap.

2. In a wheel as claimed in claim 1, the further improvement comprising means for securing the outer ends of said flexible spokes to said rim so that said spokes are forced to bow as said rim moves into said second circular path.

3. In a wheel as claimed in claim 1, the improvement wherein said means for securing the outer ends of said flexible spokes to said rim comprises a band substantially circumferentially of said rim and covering said outer ends of said spokes.

4. In a wheel as claimed in claim 2, the further improvement wherein said tongue consists of one end of said band.

5. In a wheel as claimed in claim 1, the improvement wherein said means for urging said rim without said segment into a second circular path comprises a tool including a lever having one end pivoted to said rim on one side of said gap, a clip having one end pivoted to said rim on the opposite side of said gap, the opposite end of said clip being pivoted to said lever.

6. In a wheel as claimed in claim 5, the further improvement wherein said segment is pivoted to said rim and movable with said lever.

7. In a wheel as claimed in claim 6, the improvement comprising means for selectively fixing the other end of said lever to said rim.

8. In a wheel as claimed in claim 7, the improvement wherein said tire is substantially non-stretchable.

* * * * *